United States Patent
Mattox et al.

(10) Patent No.: US 8,578,672 B2
(45) Date of Patent: *Nov. 12, 2013

(54) INTUMESCENT BACKER ROD

(75) Inventors: Timothy M. Mattox, Medina, OH (US); Gregory P. Garwood, Hudson, OH (US)

(73) Assignee: Tremco Incorporated, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,228

(22) Filed: Aug. 1, 2011

(65) Prior Publication Data

US 2012/0110934 A1 May 10, 2012

Related U.S. Application Data

(63) Continuation of application No. 12/848,289, filed on Aug. 2, 2010, now abandoned.

(51) Int. Cl.
*E04B 1/78* (2006.01)
*E04B 1/74* (2006.01)
*E04B 1/68* (2006.01)

(52) U.S. Cl.
USPC .... 52/396.01; 52/396.08; 52/232; 52/396.04; 404/74

(58) Field of Classification Search
USPC ............ 52/396.01, 393, 396.04, 396.08, 317; 404/67, 47, 69, 74
See application file for complete search history.

(56) References Cited

U.S. PATENT DOCUMENTS

| | | | |
|---|---|---|---|
| 2,009,547 A * | 7/1935 | Ginder | ............................. 52/438 |
| 3,100,677 A | 8/1963 | Frank et al. | |
| 3,455,850 A | 7/1969 | Saunders | |
| 3,869,831 A | 3/1975 | Gibb | |
| 4,058,947 A * | 11/1977 | Earle et al. | ................. 52/396.01 |
| 4,299,872 A * | 11/1981 | Miguel et al. | ................. 428/117 |
| 4,374,207 A | 2/1983 | Stone et al. | |
| 4,380,593 A | 4/1983 | von Bonin et al. | |

(Continued)

FOREIGN PATENT DOCUMENTS

CA 2722157 5/2011

OTHER PUBLICATIONS

Alva-Tech Inc. Fire Stop Product Sheet, published 2010.
FAQ's for Flex—Protex Joint Fillers, brochure published 2010.

(Continued)

*Primary Examiner* — Phi A
(74) *Attorney, Agent, or Firm* — Calfee, Halter & Griswold LLP

(57) ABSTRACT

A backer rod adapted for forming a fire-resistant seal within a construction joint. The backer rod may include an elongated tube defining a total assembly volume and a hollow interior, and a core disposed within the hollow interior. The tube is formed of a combustible foam plastic which disintegrates when exposed to fire. The core material is expandable when exposed to fire, such that the core has an intumescent expansion factor sufficient to expand to a volume beyond the total assembly volume. The backer rod may be press fit into a void between two surfaces to a depth. A sealant layer may be formed within the void. When exposed to fire on a side opposite the sealant layer, the external shell disintegrates, the core expands within the void in a direction away from the sealant layer, and a fire-resistant barrier is formed within the void between the surfaces.

14 Claims, 3 Drawing Sheets

(56) References Cited

U.S. PATENT DOCUMENTS

| | | | |
|---|---|---|---|
| 4,454,190 A | 6/1984 | Katagiri | |
| 4,588,523 A | 5/1986 | Tashlick et al. | |
| 4,621,956 A | 11/1986 | Hartman et al. | |
| 4,622,251 A | 11/1986 | Gibb | |
| 4,622,794 A | 11/1986 | Geortner | |
| 4,784,516 A | 11/1988 | Cox | |
| 4,824,283 A | 4/1989 | Belangie | |
| 4,825,617 A | 5/1989 | Kinoshita et al. | |
| 4,839,223 A | 6/1989 | Tschudin-Mahrer | |
| 4,857,364 A | 8/1989 | von Bonin | |
| 4,927,291 A | 5/1990 | Belangie | |
| 4,931,484 A | 6/1990 | Hovis et al. | |
| 4,977,719 A | 12/1990 | LaRoche et al. | |
| 4,996,099 A | 2/1991 | Cooke et al. | |
| 5,007,765 A | 4/1991 | Dietlein et al. | |
| 5,024,554 A | 6/1991 | Benneyworth et al. | |
| 5,058,342 A | 10/1991 | Crompton | |
| 5,059,631 A | 10/1991 | Hovis et al. | |
| 5,072,952 A | 12/1991 | Irregeher et al. | |
| 5,098,782 A | 3/1992 | Hovis et al. | |
| 5,130,176 A | 7/1992 | Baerveldt | |
| 5,190,395 A | 3/1993 | Cathey et al. | |
| 5,195,282 A | 3/1993 | Campbell | |
| 5,197,250 A | 3/1993 | Kramer | |
| 5,213,441 A | 5/1993 | Baerveldt | |
| 5,253,459 A | 10/1993 | Parinas et al. | |
| 5,269,110 A * | 12/1993 | Morrison et al. | 52/220.8 |
| 5,276,064 A | 1/1994 | Hartman | |
| 5,277,515 A * | 1/1994 | Hovis et al. | 404/74 |
| 5,311,715 A * | 5/1994 | Linck et al. | 52/396.01 |
| 5,335,466 A | 8/1994 | Langohr | |
| 5,387,050 A | 2/1995 | Hovis et al. | |
| 5,439,319 A * | 8/1995 | Flanagan et al. | 405/152 |
| 5,440,847 A | 8/1995 | Butler | |
| 5,482,686 A | 1/1996 | Lebold et al. | |
| 5,502,937 A | 4/1996 | Wilson | |
| 5,513,927 A | 5/1996 | Baker et al. | |
| 5,645,926 A | 7/1997 | Horrocks et al. | |
| 5,664,906 A | 9/1997 | Baker et al. | |
| 5,690,447 A | 11/1997 | Metzger | |
| 5,735,633 A | 4/1998 | Metzger | |
| 5,935,695 A | 8/1999 | Baerveldt | |
| 5,948,834 A | 9/1999 | Schneider | |
| 6,039,503 A * | 3/2000 | Cathey | 404/67 |
| 6,131,352 A | 10/2000 | Barnes et al. | |
| 6,231,818 B1 | 5/2001 | TenEyck | |
| 6,532,708 B1 | 3/2003 | Baerveldt | |
| 6,666,618 B1 | 12/2003 | Anaya et al. | |
| 6,685,196 B1 | 2/2004 | Baerveldt | |
| 6,747,074 B1 | 6/2004 | Buckingham et al. | |
| 6,898,910 B2 | 5/2005 | Bellino, Jr. | |
| 6,989,488 B2 | 1/2006 | Valenziano | |
| 6,993,874 B2 | 2/2006 | Trout | |
| 6,997,640 B1 | 2/2006 | Hohmann, Jr. | |
| 7,096,629 B1 | 8/2006 | Cox | |
| 7,387,822 B2 | 6/2008 | Dinwoodie | |
| 7,506,480 B1 | 3/2009 | Chandler | |
| 2002/0056242 A1 | 5/2002 | Andresen | |
| 2003/0124930 A1 | 7/2003 | Horrocks et al. | |
| 2003/0213211 A1 | 11/2003 | Morgan et al. | |
| 2004/0203305 A1 | 10/2004 | Horrocks et al. | |
| 2005/0034389 A1 | 2/2005 | Boot | |
| 2005/0176322 A1 | 8/2005 | Dinwoodie | |
| 2006/0117692 A1 | 6/2006 | Trout | |
| 2007/0151185 A1 | 7/2007 | Robinson | |
| 2008/0172967 A1 | 7/2008 | Hilburn | |
| 2011/0123801 A1 * | 5/2011 | Valenciano | 428/394 |
| 2012/0023846 A1 | 2/2012 | Mattox | |

OTHER PUBLICATIONS

FAQ's for Intumesecent Products, brochure published 2010.
Product Data Sheet for Alva—Therm Intumescent Sheet.
Product Data Sheet for Alva-Tech Firestop Brick 27A, published 2010.
Product Data Sheet for Alva-Tech Inc. FB-525 Fire Barrier Material,Underwriters Laboratories, Inc. published 1985, revised 1991, 2003.
Product Data Sheet for Alva-Tech Inc. FB-65NH-5 Fire Barrier Material, Underwriters Laboratories, Inc., published 1995, revised 2002.
Product Data Sheet for Alva-Tech Inc. Fire Barrier Material FB-725 Composite Sheet, Underwriters Laboratories, Inc., published 1992, revised 2007, 2008, 2010.
Product Data Sheet for Alva-Tech Intumescent Foam Sheet FIFS, published 2010 (product sold as least as early as 2007).
Product Data Sheet for Alva-Tech Intumescent Sheet FBP-15NH, published 2010, (product sold at least as early as 2007).
Product Data Sheet for Alva-Tech Intumescent Sheet FBS-10NH, published 2010, (product sold at least as early as 2002).
Tech Data Sheet: Denver Foam®, Backer Rod Mfg. Inc., Jan. 2009, http://www.bayindustries.com/backerrod/pdf/denverdataDec2009.pdf.
Tech Data Sheet: Mile High Foam®, Backer Rod Mfg. Inc., Feb. 2001, http:/www.bayindustries.com/backerrod/pdf/milehightechdata.pdf.
Tech Data Sheet: Ultra Block®, Backer Rod Mfg. Inc., Feb. 2001 http://www.bayindustries.com/backerrod/pdf/ultrablockdata.pdf.
Office Action from U.S. Appl. No. 12/848,289, mailed Oct. 12, 2011.
Restriction Requirement from U.S. Appl. No. 12/625,248, mailed Sep. 6, 2011.
Office Action from U.S. Appl. No. 12/625,248 (Paper No. 3), mailed Jan. 6, 2012.
Response to Office Action from U.S. Appl. No. 12/625,248, dated Feb. 6, 2012.
Response from U.S. Appl. No. 12/848,289 dated Sep. 12, 2012.
Office action from U.S. Appl. No. 12/848,289 dated Jun. 13, 2012.
Response from U.S. Appl. No. 12/848,289 dated Mar. 9, 2012.
Alva-Tech FLEX-PROTEX Joint Filler, based on brochure published 1980, http://www.alva-tech.com/flex-protex/ (accessed via world-wide-web Sep. 20, 2012).
Hilti Corporation CP 658 Firestop Plug Product Sheet, undated, may have been on sale prior to Nov. 24, 2009 (accessed via world-wide-web Sep. 20, 2012).
Office action from Canadian Application No. 2,747,908 dated Oct. 9, 2012.

* cited by examiner

INTUMESCENT BACKER ROD

CROSS-REFERENCE TO RELATED APPLICATIONS

This application is a continuation of U.S. Non-Provisional patent application Ser. No. 12/848,289, entitled "Intumescent Backer Rod," filed Aug. 2, 2010, the entire disclosure of which is incorporated herein by reference.

BACKGROUND

In the design and construction of buildings, a variety of architecture requirements and building codes must be considered. External elements are one of many factors to be addressed. For example, construction joints in various structures are often required to be sealed, ensuring a compartment within a building structure is protected from air or water transfer. If the construction is fire-resistant rated, a seal may also be required to have insulation properties and/or be fire resistant to contain a fire in the area of origin. A seal of this type prohibits the spread of the fire, for example, from the floor of origin to another floor. Although the fire could spread in any direction, in a floor seal the anticipated fire exposure is conventionally assumed from the bottom in test standards.

One type of conventional seal is formed within an expansion joint. For example, the seal may be formed in a void between two floor sections, such as opposing concrete sections. This type of seal can be made by a backer rod inserted into the void to a desired depth, with an amount of sealant placed on top of the backer rod. As such, the position of the backer rod acts to control the depth of the sealant within the void. Backer rods can also be installed between concrete sections of a sidewalk. Similar to installation between floor sections, the backer rod in a sidewalk serves as a depth control for a sealant.

For standard construction joints that are not fire-resistant rated, it is typical to use a closed-cell polyethylene foam backer rod between the two surfaces. An exemplary backer rod of this type is discussed in U.S. Pat. No. 6,997,640 to Hohmann, Jr. The patent describes a backer rod with a service temperature range up to 450 degrees Fahrenheit. A backer rod with this characteristic would not be regarded as fire resistant. Specifically, fire tests performed in accordance with industry standards generate a 450 degree temperature exposure within 5 minutes after the start of a test. Present and accepted industry testing requirements for fire resistance are detailed in (1) ASTM E1966 Standard Test Method for Fire-Resistive Joint Systems and (2) ANSI/UL 2079 Tests for Fire Resistance of Building Joint System). In other words, fire resistant rated joints between construction elements require a more substantial insulation barrier at elevated temperatures.

Conventionally, a fire resistant joint has been obtained using a slag mineral wool or a ceramic fiber as the depth control medium. These products have a high tolerance to heat exposure and limit heat transfer by maintaining their structure when exposed to the extreme temperatures of a fire test, which can be as high as 2000 degrees Fahrenheit for a 4 hour exposure test.

SUMMARY OF THE INVENTION

In an illustrated embodiment of the invention, a construction assembly for use in filling a space between two opposing surfaces is disclosed. The assembly includes an elongated tube defining a total assembly volume and a hollow interior, and a core disposed within the hollow interior. The tube is formed of a first material, and the core is formed of a second material. The first material is a combustible foam plastic which disintegrates when exposed to fire. The second material is expandable when exposed to fire, such that the second material has an intumescent expansion factor sufficient to expand to a volume beyond the total assembly volume.

In another embodiment, a construction assembly includes first and second elements which are opposing and adjacent to define a void, a backer rod press fit into the void to a depth to define a sealant collection cavity, and a sealant layer within the sealant collection cavity. The backer rod has an external shell defining a total rod volume and a hollow interior, and a core disposed within the hollow interior. The external shell is formed of a combustible material, and the core is formed of an intumescent material. The sealant layer forms a bond between the backer rod and the first surface, the backer rod and the second surface, and the first surface and the second surface. When exposed to fire on a side opposite the sealant layer, the external shell disintegrates and the core expands within the void in a direction away from the sealant layer. A resultant fire-resistant barrier is formed within the void between the first and second element.

BRIEF DESCRIPTION OF THE DRAWINGS

Further features and advantages of the invention will become apparent from the following detailed description made with reference to the accompanying drawings, wherein.

DETAILED DESCRIPTION

Figure 1:
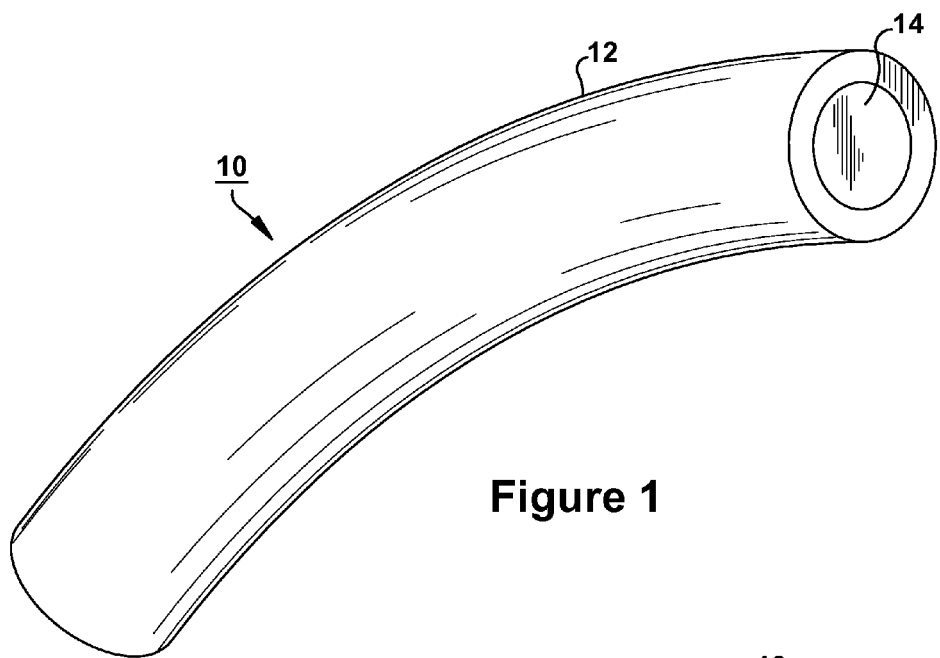
FIG. 1 is a front perspective view of an intumescent backer rod, showing a tube and a core.

This Detailed Description of the Invention merely describes embodiments of the invention and is not intended to limit the scope of the claims in any way. Indeed, the invention as described is broader than and unlimited by the preferred embodiments, and the terms used have their full ordinary meaning, unless otherwise specifically defined herein.

Also, while the exemplary embodiments described in the specification and illustrated in the drawings relate to an intumescent rod suitable for building construction, it should be understood that many of the inventive features described herein may be applied to applications in which expansion, insulation and/or heat resistance properties are beneficial, such as for example, the airplane and automobile industries.

The present invention contemplates a backer rod that serves several purposes in a construction assembly. The backer rod is adapted to provide sealant depth control, while at the same time providing insulation that will endure industry standard fire resistance tests. In an exemplary construction assembly, the backer rod will provide insulation in accordance with ASTM E1966 or ANSI/UL 2079. As such, the backer rod is an alternative to conventional mineral wood or ceramic fiber materials. Working in conjunction with a sealant, the backer rod may be placed in joint spaces between fire-rated construction assemblies and recessed to a proper sealant depth requirement.

In one embodiment, the invention uses a polyethylene shell that is filled with an intumescent polyurethane foam. The polyethylene shell provides a closed-cell feature that prevents 3 point adhesion of the sealant to the shell surface during application in a joint. The intumescent foam core, when exposed to fire, is expandable up to and over 10 times the original size, filling the joint space with a heat resistant char that protects the sealant on the unexposed test surface. Exposure from fire may result from a multitude of scenarios, such as for example, direct contact with flames, indirect contact with flames, radiant heat from a fire source, or heat for fire at an adjacent or remote location.

In a method of the invention, the invention contemplates a method of controlling sealant depth in construction joints between fire-resistance rated building elements. The method uses a backer rod device sized larger than the joint gap space intended for application. The backer rod is friction fitted into construction gaps and recessed to accommodate an appropriate depth of sealant for weatherproofing, fire stopping, or other various purposes. A discussed, the backer rod is designed to provide a bond-breaking surface preventing 3 point adhesion which can limit useful life of a sealant. The backer rod further provides an intumescent feature that expands to fill the joint space with an insulating char to impede fire advancement through the joint.

Figure 2:
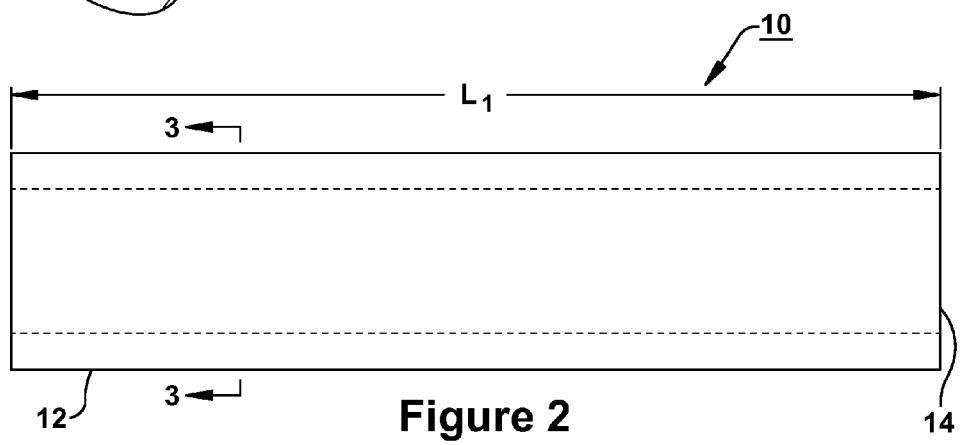
FIG. 2 is a front view of the intumescent backer rod of FIG. 1.

Referring now to the Figures, a front perspective view of a backer rod 10 is illustrated in FIG. 1. The backer rod 10 includes an external shell or tube 12, and a core 14. The backer rod 10 shown in FIGS. 1 and 2 is of an exemplary length $L_1$. The backer rod can be constructed to any proper length by one of several known methods, including extruding or molding the tube, and then filling the tube with an uncured material. Another construction method includes curing the core in a mold, and then wrapping elongated slats or sections of tube material around the core, and forming a joint along the longitudinal axis of the backer rod. Regardless of construction, FIG. 3 illustrates a cross-sectional view of the backer rod 10 as seen along the line 3-3 in FIG. 2.

The external shell or tube 12 is constructed of a foamed plastic. The foam plastic may be impermeable to water. An exemplary foam plastic for the tube 12 is closed cell low density polyethylene. The polyethylene shell is advantageous in applications within a joint. When a sealant is applied within a joint and on the exterior of the tube 12, the closed celled feature prevents 3 point adhesion of the sealant to the shell surface during application in a joint, i.e., adhesion to the core surface. However, it should be understood by others with skill in the art that other suitable foams may be used in the practice of the invention.

Figure 3:
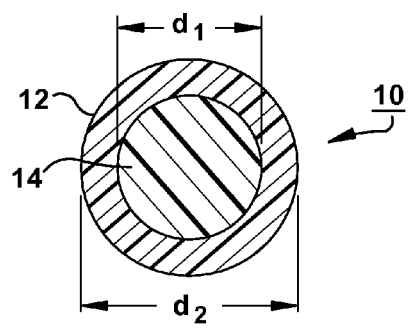
FIG. 3 is a cross-sectional view of the intumescent backer rod of FIG. 1 as seen along the line 3-3 in FIG. 2, showing an exemplary ratio between an inner diameter of the tube and an outer diameter of the tube.

As shown in FIG. 3, the tube 12 has an inner diameter $d_1$ and an outer diameter $d_2$. These diameters are to be sized according to application joint size and movement requirements. The inner diameter $d_1$ of the core defines a hollow interior into which the core material is positioned. As discussed, the outer diameter $d_2$ defines a flexible contact surface for the sealant.

A total assembly volume of the backer rod is defined by the outer diameter $d_2$ of the tube 12. With any specific given length $L_1$, a total assembly volume of the backer rod is defined as a function of the outer diameter $d_2$ of the tube 12, i.e., volume=$L_1\pi(d_2/2)^2$. The performance of the backer rod 10 when exposed to fire is measurable several ways, including in regard to the total assembly volume.

FIGS. 1-3 illustrate the core 14 disposed within a hollow interior of the tube 12. The core 14 is formed of different material than the tube 12. The core material is expandable when exposed to fire. In a preferred embodiment, the core 14 is constructed of an intumescent material, such as for example, an intumescent polyurethane foam having a primary intumescent additive, such as expandable graphite. In one example, the intumescent polyurethane foam is 30% graphite. However, it should be understood by others with skill in the art that other suitable intumescent core materials may be used in the practice of the present invention.

The physical performance of the intumescent core material as a fire resistant material is measurable various ways. As one example, the intumescent expansion factor is the ratio of a material height before and after a heating, under a test condition that allows only expansion in the vertical direction. In a preferred embodiment, the core 14 is formed of a material having an intumescent expansion factor of at least 30.

Referring again to FIGS. 2 and 3, the physical performance of the backer rod 10 is at least in part effected by the intumescent properties of the core 14. As discussed, the tube 12 is constructed of a combustible foam plastic. As such, tube 12 will disintegrate when exposed to fire. In contrast, the core material is expandable when exposed to fire. Specifically, the core material has an intumescent expansion factor sufficient to expand to a volume beyond the total assembly volume of the illustrated backer rod 10, as initially measured at room temperature before any fire exposure.

Figure 4:
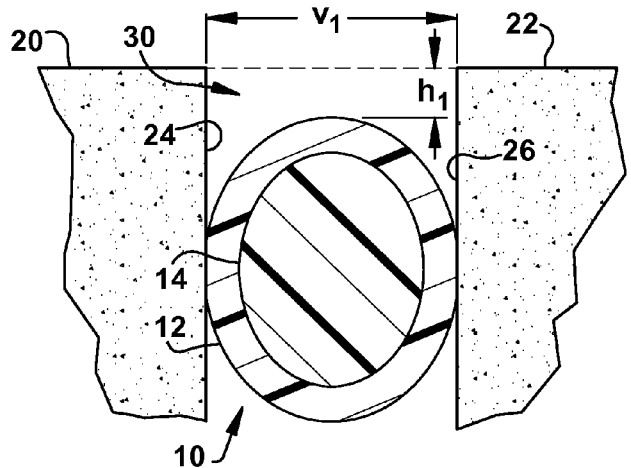
FIG. 4 is an enlarged cross-sectional view of the intumescent backer rod of FIG. 1 as partially installed in an exemplary construction application.

The expansion properties of the backer rod 10 are beneficial to provide fire resistance in an joint application. In FIG. 4, a backer rod 10 is illustrated in an exemplary application environment in an enlarged cross-sectional view. The backer rod 10 is shown after installation in a compressed fit between a first construction element 20 and a second construction element 22. The backer rod 10 is illustrated in a pre-fire condition, after only partial installation. As shown, no sealant has been applied to form a finished joint assembly.

The construction elements 20, 22 are adjacently disposed to form a construction joint. In general, the construction elements 20, 22 may be combustible. Specifically, the first element 20 is formed of a material having a first fire-resistant rating and the second element 22 is formed of a material having a second fire-resistant rating. The first and second fire-resistant ratings may be the same of different. The construction elements 20, 22 may be made of conventional materials, such as concrete or wood. As shown, a first surface 24 of the first construction element 20 is opposing and adjacent a second surface 26 of the first construction element 22. In this position, the surfaces 24, 26 form a void between the construction elements 20, 22. The void has a width $v_1$ that is not greater than the tube 12 outer diameter $d_2$. As shown, the width $v_1$ is less than the tube 12 outer diameter $d_2$. In the practice of the invention, the width $v_1$ can be up to 4 inches or greater.

Figure 5:
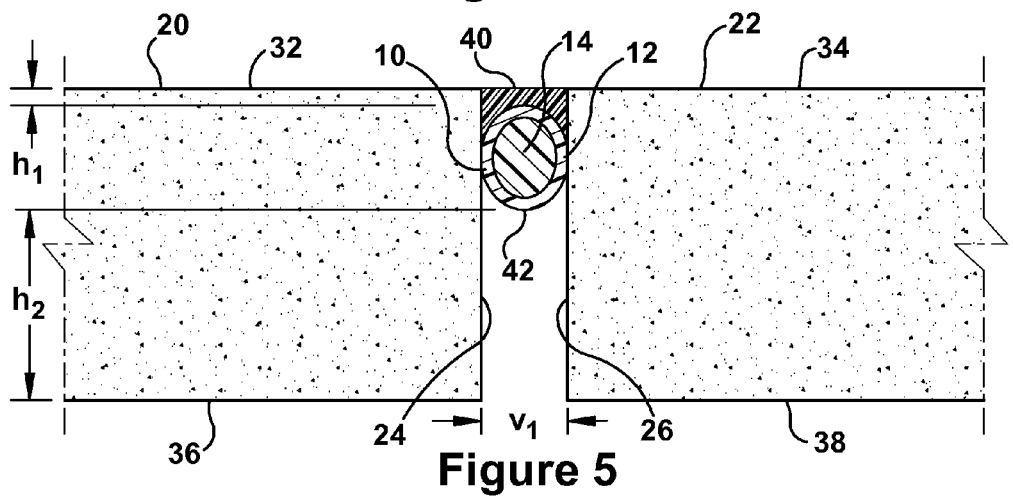
FIG. 5 is a cross-sectional view of the intumescent backer rod of FIG. 1 as installed in an exemplary construction application, shown in a pre-fire condition.

The backer rod 10 is installed within the void for sealant and fire-resistant purposes. Referring again to FIG. 4, the backer rod 10 is press fit into the void to a depth $h_1$ to define a sealant collection cavity 30 within the void. In FIG. 5, the cavity 30 is shown filled with a sealant 40. Although the sealant level may vary, the sealant 40 is shown filled to a level equal to the top horizontal surfaces 32, 34 of the construction elements 20, 22. After sealant application, the backer rod essentially maintains a depth of $h_1$ to the top of the tube 12, and a distance of $h_2$ (see FIG. 5) from the bottom of the tube 12 to bottom horizontal surfaces 36, 38 of the construction elements 20, 22.

Once cured, the sealant layer forms a bond between the backer rod 10 and the first surface 24, the backer rod 10 and the second surface 26, and the first surface 24 and the second surface 26. However, the sealant does not penetrate the closed-cell tube 12 to the depth of the core 14. The condition illustrated in FIG. 5 is in compliance with an industry standard pre-fire condition requirements.

Figure 6:
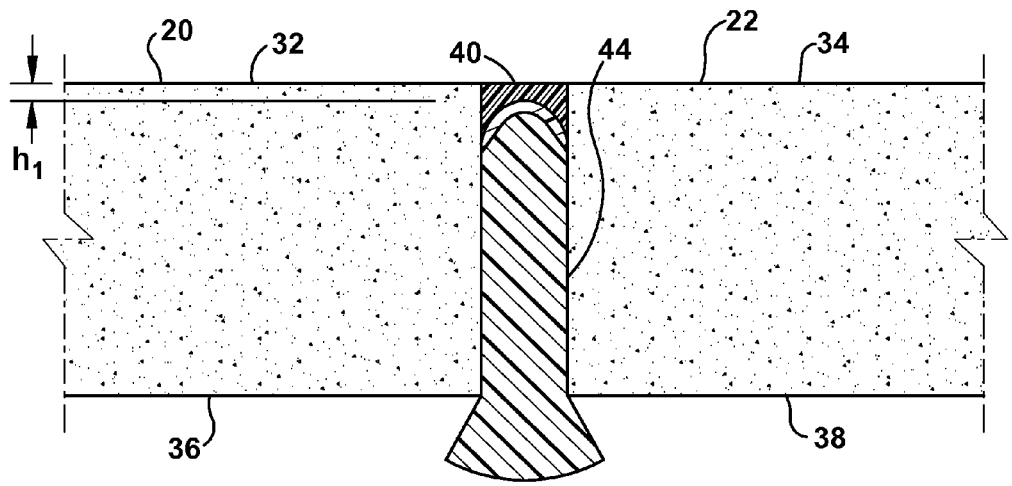
FIG. 6 is a cross-sectional view of the intumescent backer rod of FIG. 1 as installed in the exemplary construction application of FIG. 5, shown in a post-fire condition.

The fire-resistant properties of the backer rod 10 and application assembly are apparent from FIG. 6. The backer rod 10 and assembly of FIG. 5 are shown in a post-fire condition. In the illustrated example, the backer rod 10 has been exposed to fire on a side 42 (see FIG. 5) opposite the sealant layer 40. The tube 12 has fully disintegrated on the side 42 opposite the sealant layer. As shown, the tube and sealant layer on the opposing side, i.e., the side opposite the fire, are in essentially the same condition as the pre-fire condition. As a result, the portion of the tube 12 on the side opposite the fire remains at essentially the same depth $h_1$ after the fire.

Still referring to FIG. 6, the intumescent core 14 has expanded during exposure to heat. As discussed, an upper and lower boundary of the sealant layer 40 remains constant upon disintegration of the portion of the tube 14 on the side 42 opposite the sealant layer 40. As a result, the intumescent core 12 has expanded within the void during the fire in a direction away from the sealant layer 40. A fire-resistant barrier 44 within the void has been formed between the first element 20 and the second element 22. As shown, the core 14 has been expanded in the fire to occupy the entire portion of the void on the side opposite the sealant layer 40. As discussed, the intumescent expansion factor of the core material is at least 30. The resultant fire-resistant barrier is an insulative char material that acts to impede travel of fire vertically through the void.

Figure 7:
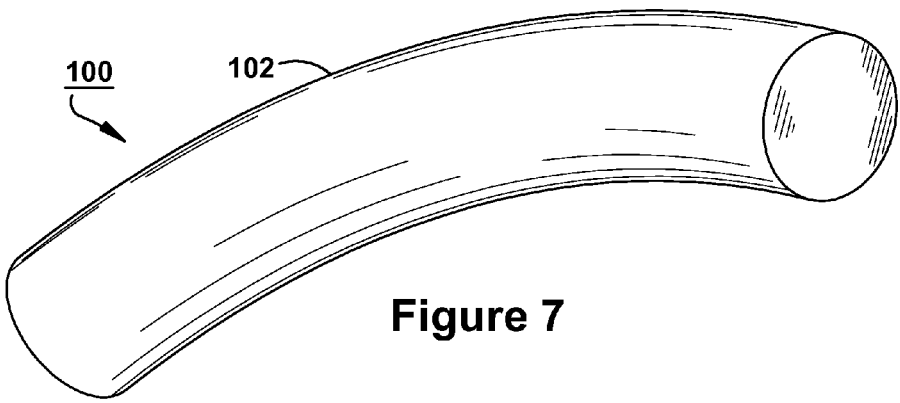
FIG. 7 is a front perspective view of another intumescent backer rod.
Figure 8:
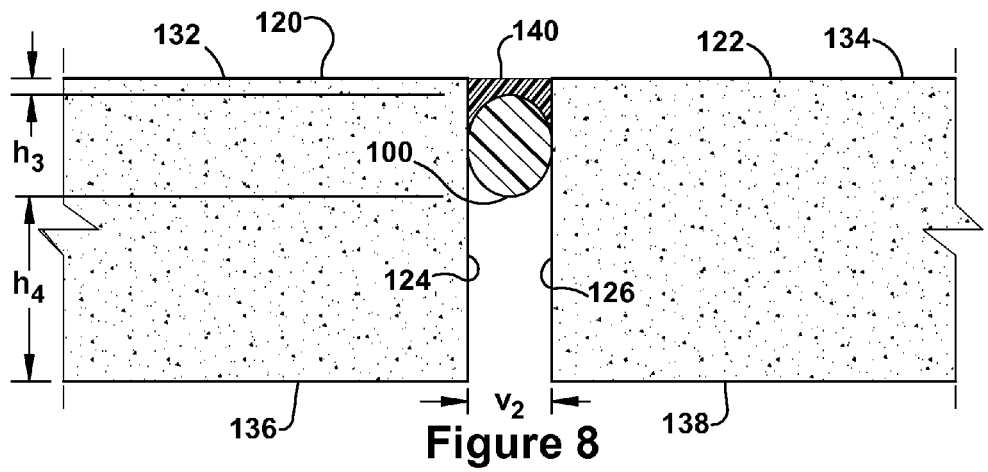
FIG. 8 is a cross-sectional view of the intumescent backer rod of FIG. 7 as installed in an exemplary construction application, shown in a pre-fire condition.
Figure 9:
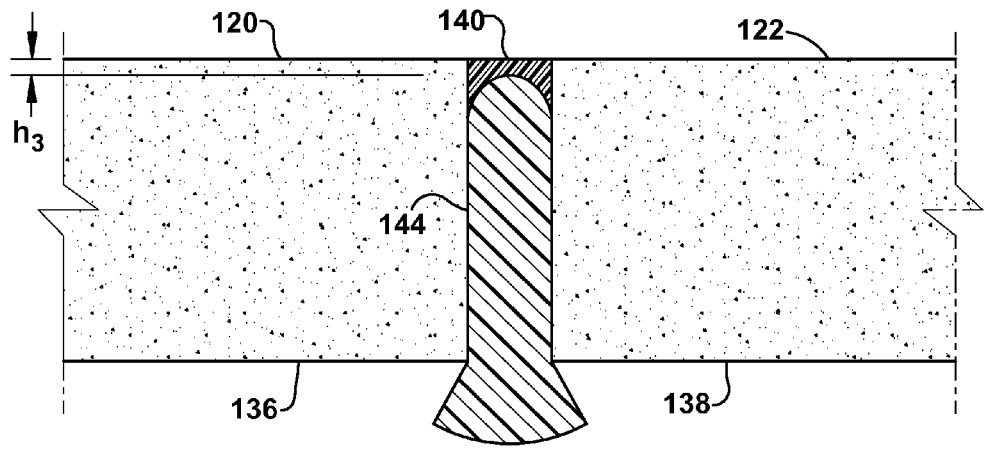
FIG. 9 is a cross-sectional view of the intumescent backer rod of FIG. 7 as installed in the exemplary construction application of FIG. 8, shown in a post-fire condition.

Another intumescent backer rod 100 of the present invention is shown in FIGS. 7-9. The backer rod is essentially the core material of the backer rod 10 of FIGS. 1-3, but without a tube or external shell. A cross-sectional view of the intumescent backer rod 100 is shown in FIG. 8, as installed in an exemplary construction application. Specifically, FIG. 8 shows the backer rod 100 in a pre-fire condition, and press-fit between two non-combustible construction elements 120, 122. The backer rod 100 is installed within a void for sealant and fire-resistant purposes.

The backer rod 100 is press fit into the void to a depth $h_3$ to define a sealant collection cavity within the void. As shown in FIG. 8, the cavity is filled with a sealant 140. Although the sealant level may vary, the sealant 140 is shown filled to a level equal to the top horizontal surfaces 132, 134 of construction elements 120, 122. After sealant application, the backer rod 100 essentially maintains a depth of $h_3$ to the top of the rod, and a distance of $h_4$ from the bottom of the rod 100 to bottom horizontal surfaces 136, 138 of the construction elements 20, 22.

In the cured position illustrated in FIG. 8, the sealant layer forms a bond between the backer rod 100 and the first surface 124, the backer rod 100 and the second surface 126, and the first surface 124 and the second surface 126. The sealant does not penetrate the backer rod 100 to any depth that would affect the expansion of the backer rod 100 in an opposing direction.

The fire-resistant properties of the backer rod 100 and application assembly are apparent from the post-fie condition shown in FIG. 9. In the illustrated example, the backer rod 100 has been exposed to fire on a side opposite the sealant layer 140. As shown, the sealant 140 on the side opposite the fire is in essentially the same condition as the pre-fire condition. As a result, the upper most portion of the backer rod 100 on the side opposite the fire remains at essentially the same depth $h_3$ after the fire. In a preferred embodiment, the fire-resistant rating of the first element 120 and the fire-resistant rating of the second element 122 are each of a level such that the width $v_2$ of the void between the surfaces 124, 126 is unchanged after expansion of the backer rod 100.

The intumescent rod 100 has expanded during exposure to the fire. The upper boundary and a lower boundary of the sealant layer has remained constant upon the backer rod 100 exposure to fire, while the intumescent blocker rod 100 has expanded within the void during the fire in a direction away from the sealant layer 140. A fire-resistant barrier 144 within the void has been formed between the first element 120 and the second element 122. As shown, the backer rod has been expanded to occupy the entire portion of the void on the side opposite the sealant layer 140. The fire-resistant layer is a mixture of char material that acts to impede travel of fire vertically through the void.

In practicing a method of the invention, a backer rod is selected with both sealant and fire resistance properties. The selected backer rod has an external shell formed by a combustible foam, such as closed cell plastic foam. The shell defines a total shell volume and a hollow interior. A core material is selected which is intumescent and may be a polyurethane foam. A proper amount of the core material is determined and disposed within the hollow interior of the external shell. The core material may be disposed in the shell by injection molding, and expands and sets within a short period of time, such as five minutes at room temperature. The proper amount of the core material is expandable beyond the total shell volume when the core material is exposed to fire.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure;

however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A construction assembly comprising:
   a first construction element defining a first end surface and formed of at least one material, the first element having a first fire-resistant rating, and a second construction element defining a second end surface and formed of at least one material, the second element having a second fire-resistant rating, wherein the first end surface and said second end surface are opposing and adjacent to define a void, the height of the void defined by a top plane and a bottom plane;
   a backer rod press fit into said void to a depth to define a sealant collection cavity within said void, said backer rod having an external shell defining a total rod volume and a hollow interior, and a core disposed within said hollow interior, wherein said external shell is formed of a combustible material and said core is formed of an intumescent material; and
   a sealant layer within said sealant collection cavity forming a bond between said backer rod and said first surface, said backer rod and said second surface, and said first surface and said second surface;
   wherein exposed to fire on a side opposite said sealant layer, said external shell disintegrates on said side opposite said sealant layer and said core expands within said void in a direction away from said sealant layer to occupy the void and break the bottom plane of the void on said side opposite said sealant layer to form a fire-resistant barrier within said void between said first element and said second element.

2. The assembly of claim 1, wherein said depth of said backer rod within said void remains constant upon disintegration of said external shell on said side opposite said sealant layer.

3. The assembly of claim 1, wherein an upper boundary and a lower boundary of said sealant layer remains constant upon disintegration of said external shell on said side opposite said sealant layer.

4. The assembly of claim 1, wherein said core is expandable to at least said total rod volume when said assembly is exposed to fire.

5. The assembly of claim 1, wherein said external shell is formed by a closed cell foam plastic.

6. The assembly of claim 1, wherein said external shell is formed of a foam plastic impermeable to water.

7. The assembly of claim 1, wherein said core is formed of an intumescent polyurethane foam.

8. The assembly of claim 1, wherein said core has an intumescent expansion factor of at least 30.

9. An improved construction assembly having a first construction element defining a first end surface and formed of at least one material, said first element having a first fire-resistant rating, and a second construction element defining a second end surface and formed of at least one material, said second element having a second fire-resistant rating, wherein said first end surface and said second end surface are opposing and adjacent to define a void, the height of the void defined by a top plane and a bottom plane, the improvement comprising:
   a backer rod formed of an intumescent material and press fit into said void to a depth to define a sealant collection cavity within said void; and
   a sealant layer within said sealant collection cavity forming a bond between said backer rod and said first surface, said backer rod and said second surface, and said first surface and said second surface;
   wherein exposed to fire on a side opposite said sealant layer, said backer rod expands within said void in a direction away from said sealant layer to form a fire-resistant barrier within said void between said first element and said second element to occupy more than the entire portion of the void and break the bottom plane of the void on said side opposite said sealant layer and said first fire-resistant rating and said second fire-resistant rating are each of a level such that said void between said first surface and said second surface is unchanged after expansion of said backer rod.

10. The assembly of claim 9, wherein said depth of said backer rod within said void remains constant upon expansion of said backer rod in said direction opposite said sealant layer.

11. The assembly of claim 9, wherein an upper boundary and a lower boundary of said sealant layer remains constant upon expansion of said backer rod in said direction opposite said sealant layer.

12. The assembly of claim 9, wherein said backer rod has an intumescent expansion factor of at least 30.

13. The assembly of claim 9, wherein said first construction element is non-combustible.

14. The assembly of claim 9, wherein said second construction element is non-combustible.

* * * * *